United States Patent [19]
Sisk

[11] Patent Number: 6,036,144
[45] Date of Patent: Mar. 14, 2000

[54] MASS PRODUCIBLE LAUNCH SYSTEM

[75] Inventor: David S. Sisk, Brownsboro, Ala.

[73] Assignee: Lockheed Martin Corporation, Bethesda, Md.

[21] Appl. No.: 08/943,432

[22] Filed: Oct. 3, 1997

[51] Int. Cl.[7] .............................. B64G 1/40; F42B 15/10; F02K 9/28; F02K 9/00
[52] U.S. Cl. ...................... 244/172; 102/374; 102/377; 60/250; 60/253; 60/255; 60/257
[58] Field of Search ................................ 244/172, 63, 62; 102/374, 377, 378; 60/250, 251, 253, 254, 255, 257

[56] References Cited

U.S. PATENT DOCUMENTS

| | | |
|---|---|---|
| 2,802,332 | 8/1957 | Orsino . |
| 3,132,562 | 5/1964 | Frevel . |
| 3,523,422 | 8/1970 | Wolf . |
| 3,537,669 | 11/1970 | Modesti .................................. 244/172 |
| 3,897,028 | 7/1975 | Doellner .................................. 244/3.1 |
| 3,934,512 | 1/1976 | Adachi . |
| 4,096,803 | 6/1978 | Kesting .................................. 102/374 |
| 4,451,017 | 5/1984 | Marshall .................................. 244/172 |
| 4,796,839 | 1/1989 | Davis . |
| 4,964,340 | 10/1990 | Daniels et al. . |
| 5,129,602 | 7/1992 | Leonard . |
| 5,141,181 | 8/1992 | Leonard . |
| 5,143,328 | 9/1992 | Leonard . |
| 5,217,188 | 6/1993 | Thole et al. . |
| 5,218,165 | 6/1993 | Cornelius et al. ....................... 102/378 |
| 5,242,135 | 9/1993 | Scott ........................................ 244/172 |
| 5,411,226 | 5/1995 | Jones et al. . |
| 5,469,701 | 11/1995 | Sneddon et al. . |
| 5,507,231 | 4/1996 | Moore et al. ............................ 102/374 |
| 5,529,264 | 6/1996 | Bedegrew et al. . |
| 5,799,902 | 9/1998 | Keith et al. .............................. 244/172 |

OTHER PUBLICATIONS

AIAA Paper No. 74–1080; AIAA/SAE 10th Propulsion Conference, San Diego, California, Oct. 21–23, 1974 "Aerospike Engine Technology Demostration For Space Propulsion", by D.H. Huang, Rocketdyne/Rockwell International Corporation, Canoga Park, California.

*Primary Examiner*—Theresa M. Wesson
*Attorney, Agent, or Firm*—Holme Roberts & Owen LLP

[57] ABSTRACT

The disclosed launch systems are formed from mass producible elements that integrate propulsion, pneumatics and structural systems. In one embodiment, a launch system (10) includes multiple stages (12–16) where each stage includes a number of generally wedge-shaped segments (54). Alternating segments (54) form liquid fuel and oxidizer tanks. Each fuel and oxidizer tank pair is associated with a thruster (70). The resulting plurality of thrusters (70) are disposed about a common aerospike thrust structure (30–34). The segments (54) are connected to an internal, hollow structural spine (26) that can also interface with an internal umbilical tower (46). The segments (54) together with their associated thrusters and related components can be mass produced, thereby increasing competition among suppliers, reducing design costs and timeframes.

29 Claims, 9 Drawing Sheets

MASS PRODUCIBLE LAUNCH SYSTEM

FIELD OF THE INVENTION

The present invention relates in general to launch systems, e.g., launch vehicles or boosters for use in launching a payload from a stationary ground-based position into orbit, and, in particular, to a launch system and production method based on a number of cooperating mass producible units or segments.

BACKGROUND OF THE INVENTION

Rocket powered vehicles for use in space missions can generally be categorized into launch systems and payload systems. Launch systems provide the primary thrust for launching the craft from ground and inserting the craft into orbit. Such launch systems include integrated launch vehicles and strap-on boosters. Once in orbit, a payload system such as a satellite, interplanetary probe, or the like may be released. The payload system typically includes propulsion subsystems for orbital maintenance, attitude control, and orbital transfer depending on the application but not for boost into orbit.

Launch systems generally include one or more rocket engines arranged to fire in one or more stages. The engines may use solid fuel and/or liquid fuel. In either case, the engine systems include at least one fuel tank, a combustion chamber and a nozzle for accelerating/discharging the combustion product. The nozzles may be gimballed for controlled thrust vectoring. In the case of liquid fuel rocket engine systems, fuel and oxidizer are generally stored in separate tanks and come into contact in the combustion chamber to provide thrust. Pneumatics are provided for charging the tanks, e.g., on the launch pad so as to reduce transportation risks. Such liquid fuel engines have gained favor for many applications for reasons of performance, economics, safety, throttling capabilities and flexible mission design.

Currently, launch systems are generally built largely without the benefits of mass production techniques and associated efficiencies of scale. In particular, due to the relatively small rate of launch system production, a particular launch system and its component parts are individually fabricated, often using manual or computer numerically controlled machine shop tools. The individual components are then fitted together and assembled. As a result of this individual fabrication process, there can be some degree of variation from component-to-component and system-to-system. Completed assemblies are carefully inspected and tested to achieve the required reliability. It will be appreciated that this process can result in high launch system production costs and a significant barrier to competition. Despite the difficulties and expense of this individual construction process, such a process has been thought necessary due to low production rates and varying mission requirements.

SUMMARY OF THE INVENTION

The present invention is directed to a mass producible launch system and associated production methods for constructing the same. The launch system of the present invention is formed from multiple segments, e.g., structural/pneumatic/propulsion elements, that can be produced in large volume, thereby allowing for implementation of mass production techniques with corresponding efficiencies of scale. Such construction can accommodate a large number of suppliers and may further reduce launch system costs through competition. The modular nature of the launch system of the present invention provides significant design flexibility to meet a variety of small to medium expendable launch system requirements, as well as other mission goals. Moreover, the system structure allows for supplemental jet propulsion, retractable central umbilical tower and other launch related options.

According to one aspect of the present invention, a launch system is constructed of multiple propulsion elements that can be mass produced. Generally, the launch system includes a first propulsion element disposed in a first angular region relative to a longitudinal axis of the system, a second propulsion element disposed in a second angular region, a combustion chamber section and a nozzle section, and attachment structure for interconnecting the propulsion elements. Each of the propulsion elements includes a fuel tank for containing a liquid rocket fuel. The combustion chamber section and the nozzle section can be a common engine system for receiving fuel and resulting combustion product from each of the propulsion elements, or the combustion chamber and nozzle sections may be segmented.

In one embodiment, the propulsion elements are formed as wedge shaped elements, where a number of such elements are arranged in annular fashion. Adjacent elements contact one another along radial walls. Each propulsion element may comprise one or more oxidizer tanks for providing an oxidizer for contacting the rocket fuel in the combustion chamber to induce combustion. The ratio of oxidizer tanks to fuel tanks can be selected to provide the desired proportioning for combustion depending on the propellant characteristics and desired mixture. The fuel tanks and oxidizer tanks can be arranged in a side-by-side or stacked configuration. The propulsion elements may further include throttle control elements to control the relative mass flows from the first and second propulsion elements for thrust vectoring, and may further selectively provide an element of tangential thrust for roll control. Multiple propulsion elements can be clustered and arranged in stages for multiple stage launch system applications.

According to another aspect of the present invention, a launch system is constructed with multiple rocket engines disposed about a hollow core. The launch system includes a structure for defining a central longitudinal cavity, at least first and second rocket fuel tanks disposed about such structure, and a rocket engine system for combusting fuel from the fuel tanks. The structure may be, for example, a separate, central spine or may be defined at least in part by inner surfaces of the tanks or related structure. The fuel tanks are preferably liquid rocket fuel tanks associated with separate oxidizer tanks, but it is possible to employ other types of rocket booster systems. Multiple identical fuel and oxidizer tanks can be disposed around the spine. The launch system can further include interfaces, e.g., electrical and/or fluid interfaces for fuel/oxidizer pressurization, adjacent to the spine for interfacing with an internal umbilical tower extending into the central longitudinal cavity. Additionally, a jet element, such as a ram jet or scram jet, can be provided in association with the central cavity to accelerate air through the cavity to provide a supplemental, air-breathing propulsion system for use within the atmosphere. In such case, appropriate air intake ducting at a front end of the cavity, and an appropriate nozzle at the rear end of the cavity can be provided.

According to a further aspect of the invention, a novel launch facility is provided. Such launch facility takes advantage of the central cavity launch system structure as described above to provide an internal umbilical tower. The launch facility generally includes an umbilical tower for extending into a central longitudinal cavity of a launch system and a pad, disposed on at least first and second opposite sides of the umbilical tower, for supporting the launch system in preparation for launching. Preferably, the tower is moveable between extended and retracted positions so that the tower can be retracted for launch. The tower can further include electrical, fluid or other interfaces for interfacing with one or more launch system stages. The pad provides support for the launch system and, in one embodiment, contacts the launch system about the periphery of a bottom surface of the system.

According to a still further aspect of the present invention, a method for constructing a launch system is provided. The method includes the steps of: providing first and second fuel tanks, first and second oxidizer tanks, and a rocket engine system having a combustion chamber section and a nozzle section assembling the first fuel tank, first oxidizer tank and rocket engine system, wherein the first fuel tank, first oxidizer tank and rocket engine define a first thruster unit; assembling the second oxidizer tank, second fuel tank and rocket engine, wherein the second fuel tank, second oxidizer tank and rocket engine system define a second thruster unit; and interconnecting the first and second thruster units such that the assembled thruster units are disposed about a central spine area. In one embodiment, the central spine area is defined by a separately provided spine structure and the thruster units are mounted on the spine by attaching the fuel tanks and oxidizer tanks to the spine, e.g., directly or via an intermediate carrier structure. Such mounting can be conducted prior to or after the assembly of the respective fuel tanks, oxidizer tanks and engine system. The various tanks can be constructed as identical mass produced items for increased efficiency and reliability with reduced costs.

BRIEF DESCRIPTION OF THE DRAWINGS

For a more complete understanding of the present invention and further advantages thereof, reference is now made to the following Detailed Description, taken in conjunction with the drawings, in which:

FIG. 2b is a side view, partially in cross-section, showing the launch system of FIG. 1 on the launch pad of FIG. 2a;

FIG. 3b is a top view of the stage of FIG. 3a;

FIG. 3c is a bottom view of the stage of FIG. 3a;

FIG. 4a is a side view of a segment of the stage of FIG. 3a;

FIG. 4b is a top cross-sectional view of the segment of FIG. 4a taken along section lines A—A of FIG. 4a;

FIG. 4c is a top view of the segment of FIG. 4a;

FIG. 4d is a bottom view of the segment of FIG. 4a;

DETAILED DESCRIPTION

The present invention is directed to a mass producible launch system and related launch pad, supplemental propulsion and control systems, as well as corresponding construction techniques. In the following description, several alternative embodiments of the invention are described in detail. It will be appreciated that many other alternatives, modifications and configurations are possible in accordance with the present invention.

Figure 1:
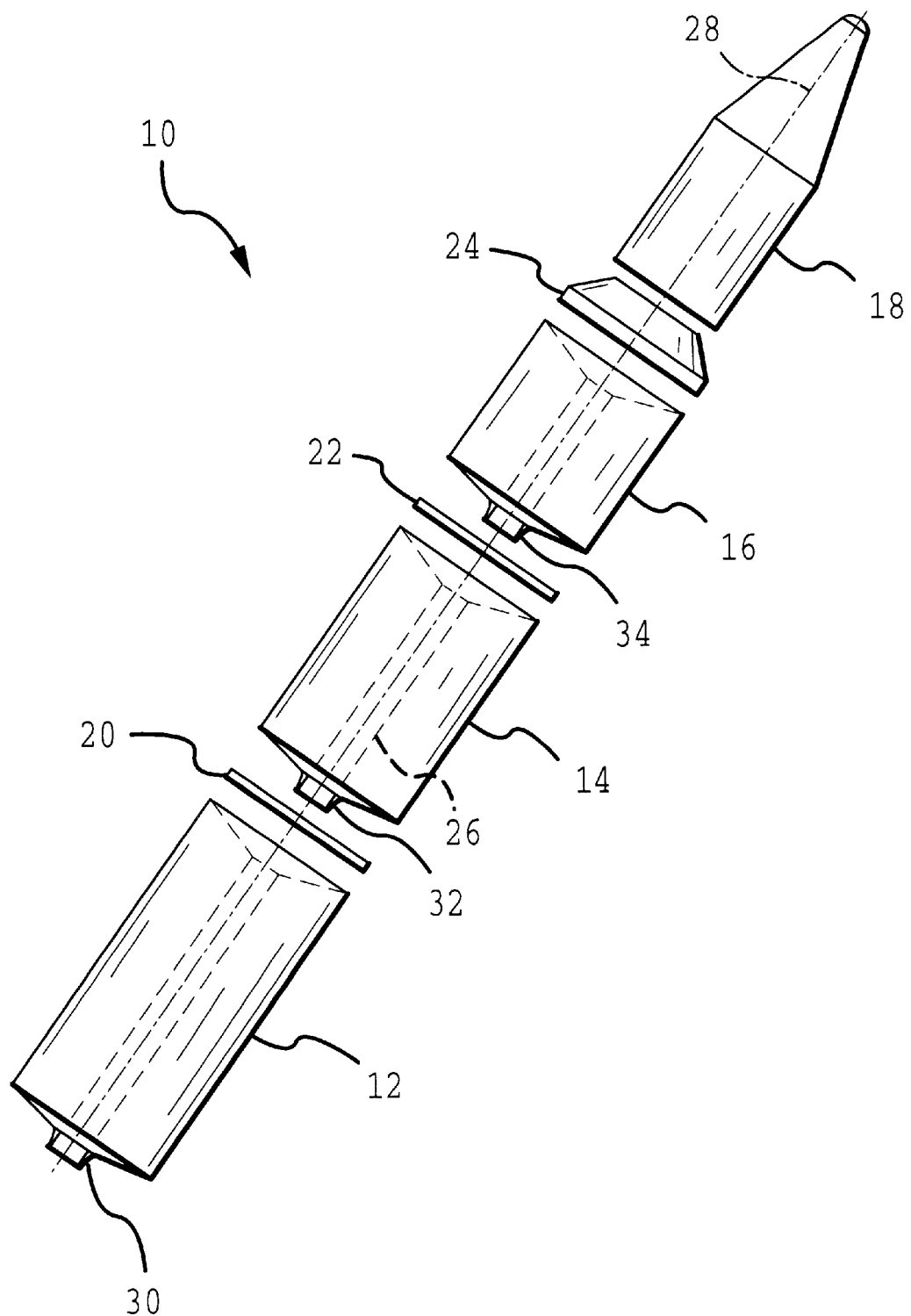
FIG. 1 is a side view of a launch system according to the present invention.

One embodiment of a launch system 10 according to the present invention is shown in FIGS. 1–4e. Referring first to FIG. 1, the illustrated launch system 10 is a multistage system, although single stage to orbit vehicles may be provided in accordance with the present invention. Generally, the illustrated launch system 10 includes a first stage 12, a second stage 14, a third stage 16, and a payload fairing 18. The payload fairing 18 houses the payload 36 (FIG. 2b) that is to be delivered to orbit, e.g., a satellite or satellites, interplanetary probe, weapon system or other payload system. The stages are separated by separation systems 20 and 22, such as any of various pyrotechnic or electromechanical systems, that allow for a separation and discharge of expended stages. In this manner, the stages 12–16 can be used in series to boost the payload into the desired orbit. The payload fairing 18 is attached to the final stage 16 by suitable payload adapter 24. As shown in FIG. 1, each of the stages includes a hollow central structural spine 26 extending along the longitudinal axis 28 of the system 10, and a thrust structure 30–34, as discussed in more detail below.

Figure 2A:
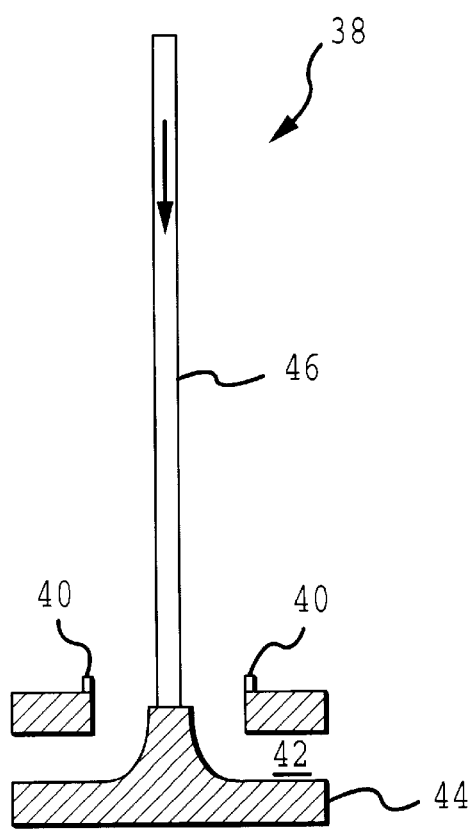
FIG. 2a is a side view of a launch pad according to the present invention.
Figure 2B:
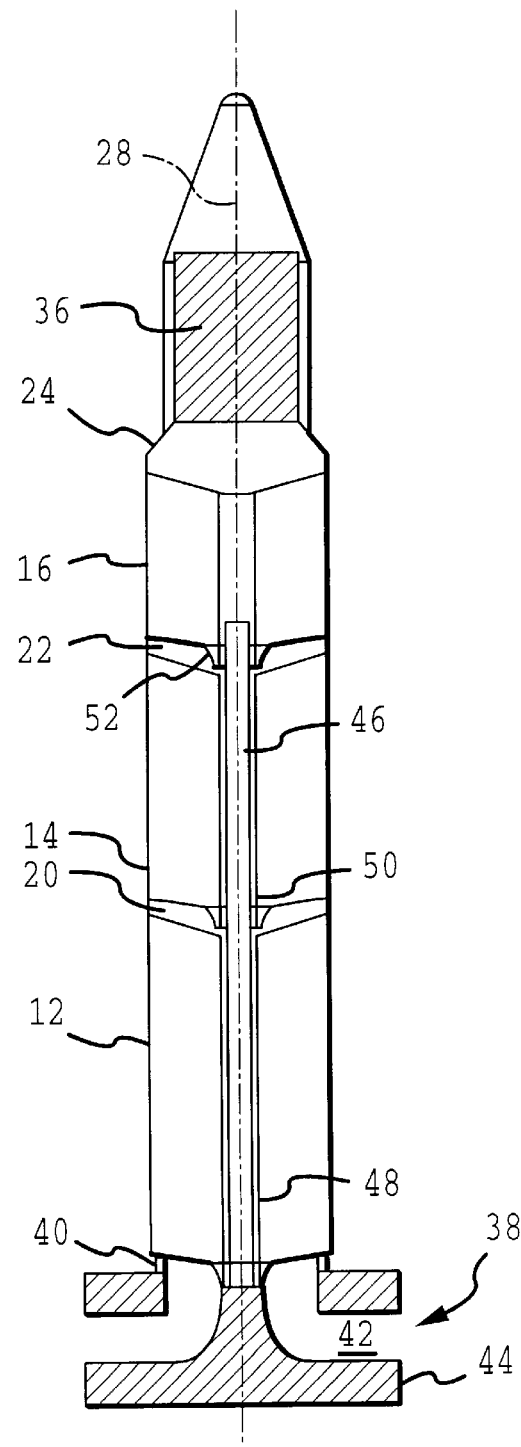

FIGS. 2a and 2b show a novel launch pad system 38 according to the present invention. The hollow structural spine 26 of the launch system 10 allows for receiving internal launch support structure, thereby eliminating electrical and pneumatic ports on the external surfaces of the system 10 and allowing much of the launch pad system 38 to be shielded from exposure to super heated rocket engine exhaust. The launch pad system 38 includes: an optional launcher interface 40 for engaging the launch system base about a periphery thereof, thus defining a launch pad pit area 42 beneath the interface 40; a launch platform 44 disposed in the pit area 42 and telescopic umbilical tower 46 that extends upwardly from the platform 44 into the hollow spine of the launch system 10.

The umbilical tower 46 provides structural support for the system 10 prior to launch and further mates with umbilical interfaces 48–52 at the base of each stage 12–16.

The umbilical interfaces 48–52 provide electrical support for system electrical systems and pneumatic connections for charging the system's propellant and oxidizer tanks, as well as life support and any additional prelaunch support services. The umbilical tower 46 is preferably moveable between an extended position (as shown) to a retracted position wherein the tower 46 is withdrawn into the supporting launch platform 44 in preparation for launch. Any suitable elevating motors may be employed to actuate the telescopic motion of the tower 46. Although not shown, sliding or swinging doors or the like may be provided to close off the pit area from the base of the system 10, thereby providing shielding against launch heat and pressure, and minimizing recurring damage to the launch pad system 38.

Figure 3B:
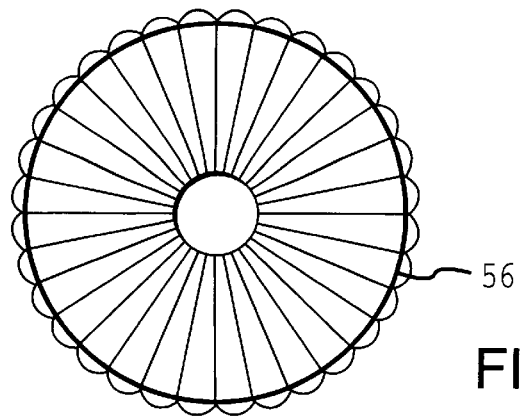
Figure 3A:
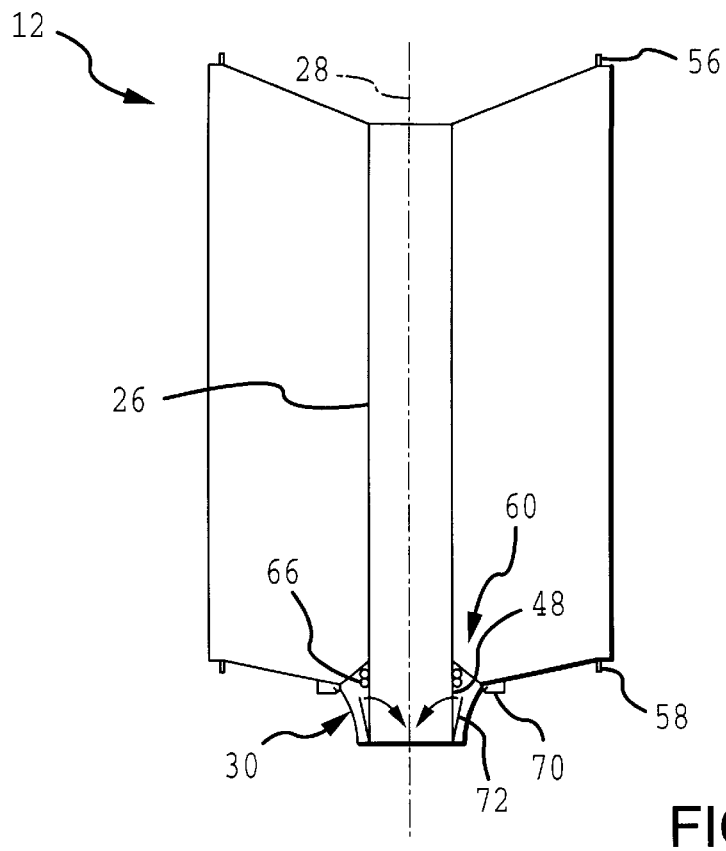
FIG. 3a is a side cross-sectional view of a stage of the launch system of FIG. 1.
Figure 3C:
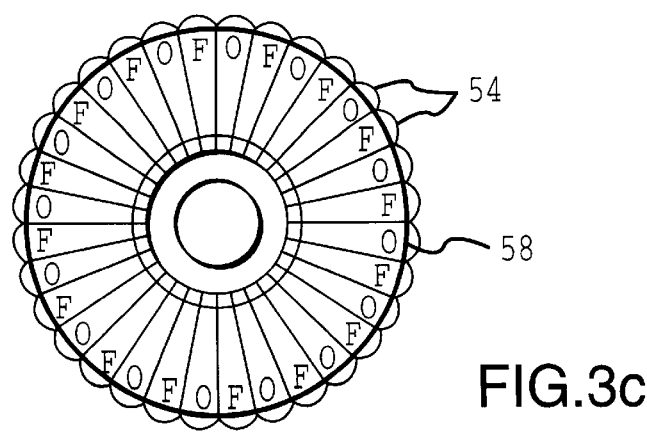
Figure 4B:
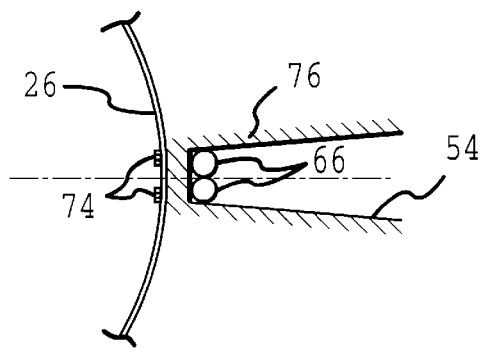
Figure 4C:
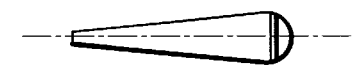
Figure 4A:
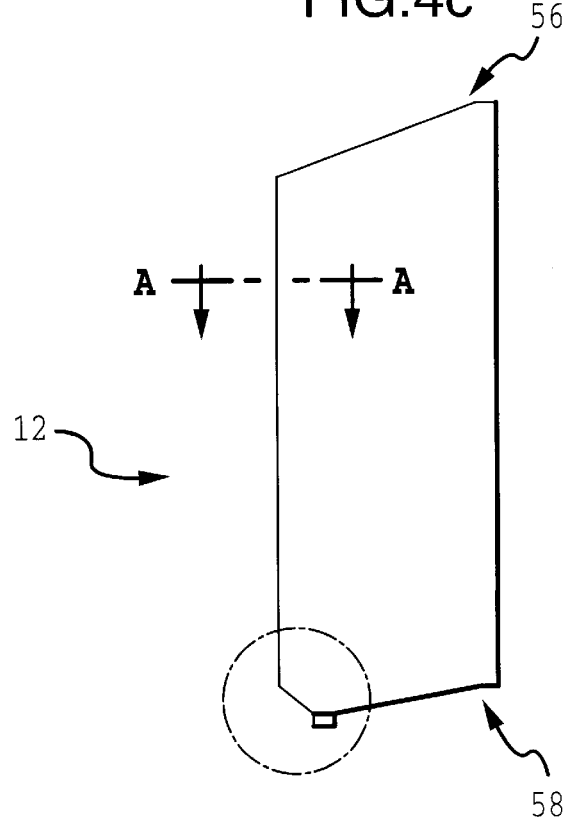
Figure 4E:
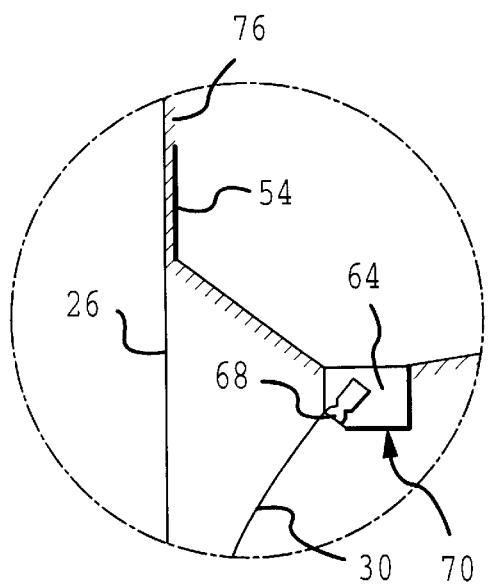
FIG. 4e is a side view of the circled portion of FIG. 4a showing details of the spine attachment and thruster interface.
Figure 4D:
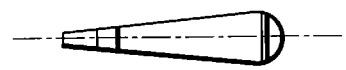
Figure 5:
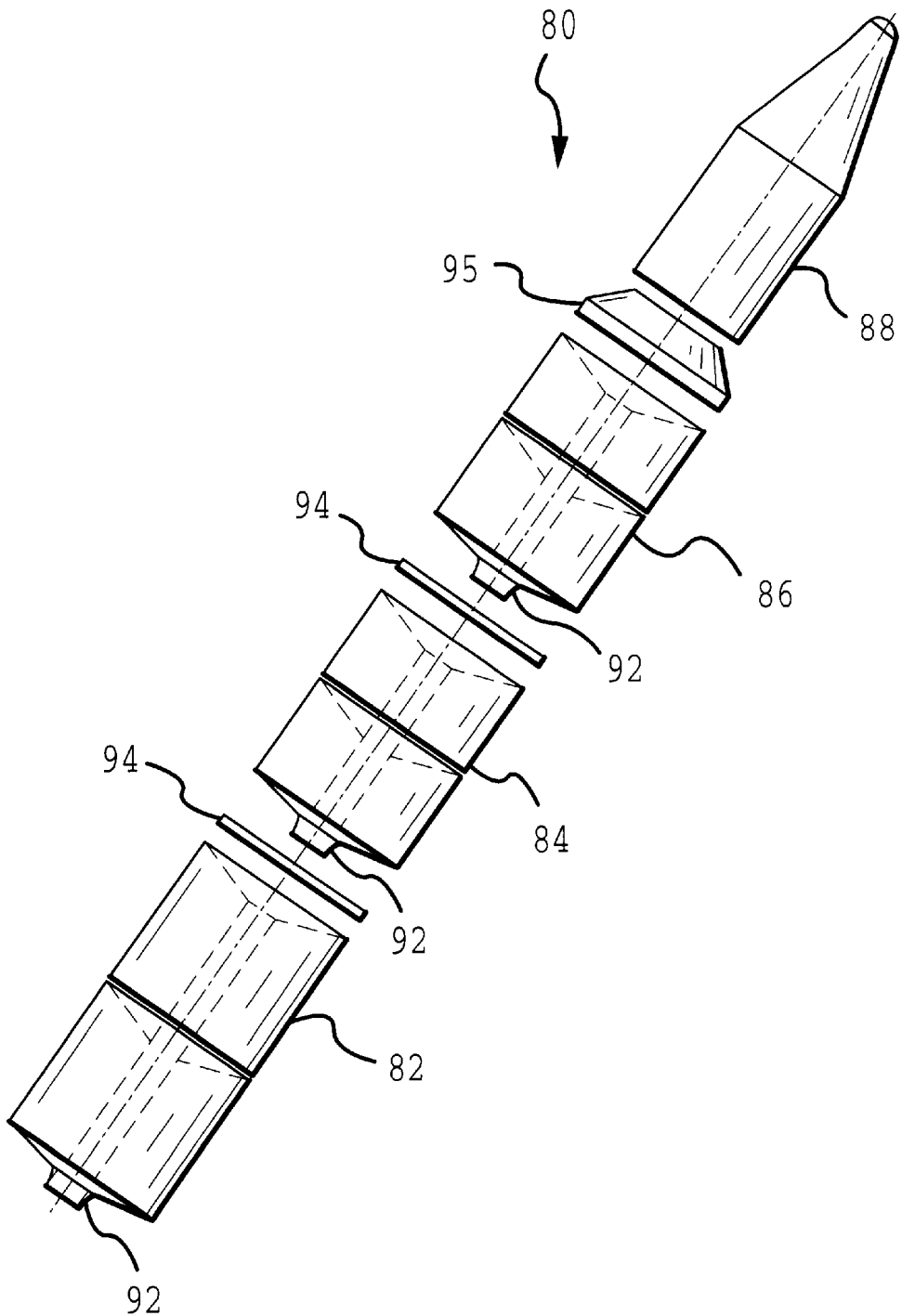
FIG. 5 is a side view of another launch system according to the present invention.
Figure 6:
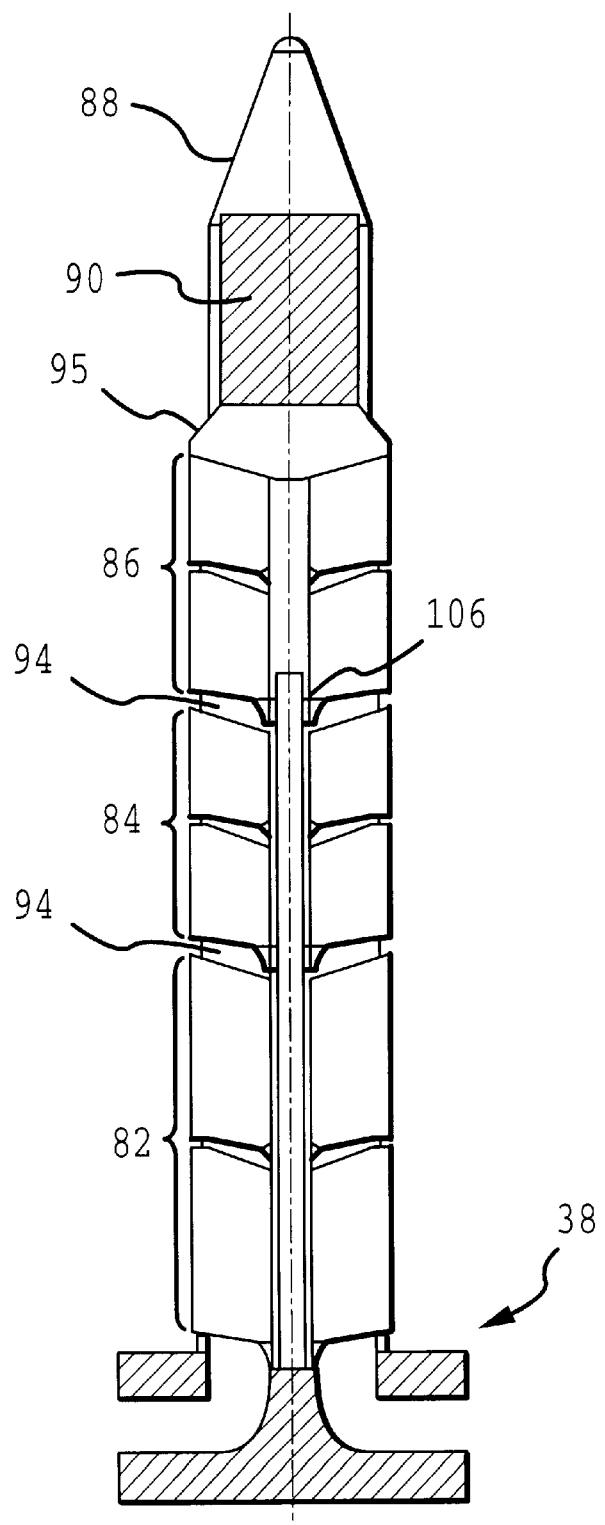
FIG. 6 is a side view partially in cross-section, showing the launch system of FIG. 5 in the launch pad of FIG. 2.
Figure 7B:
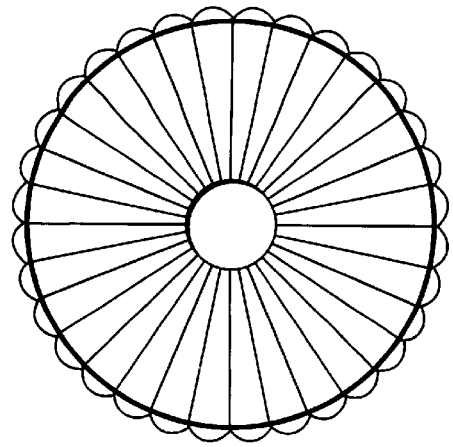
FIGS. 7a–7c are side, top and bottom views, respectively, of a stage of the launch system of FIG. 5.
Figure 7A:
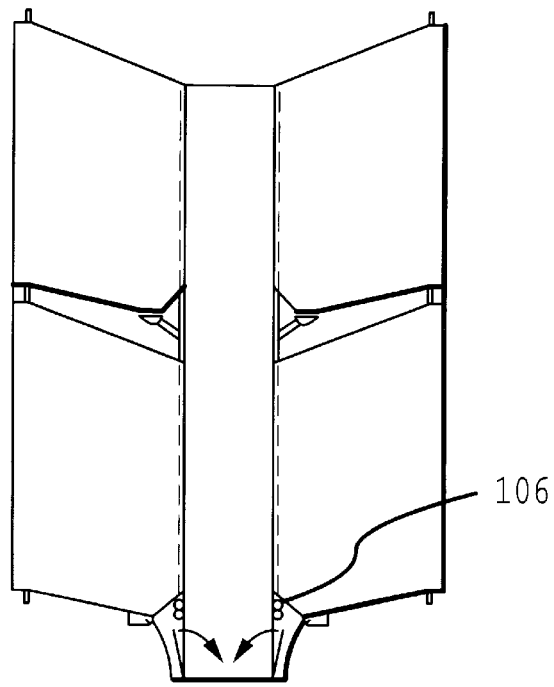
Figure 7C:
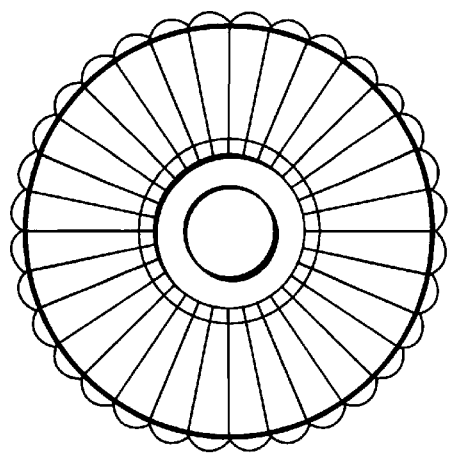

FIGS. 3a–3c show details of a single stage 12, 14 or 16. Each stage 12–16 is composed of multiple, preferably substantially identical elements or segments 54 that can be produced in quantity thereby allowing mass production techniques to be employed with attendant reliability and efficiency advantages. In this regard, propulsion, pneumatics and structural systems are preferably incorporated into such mass producible, substantially identical elements. The number of segments 54 in the launch system 10 can be varied depending on mission requirements and it is expected that the number of segments required for typical missions will be between about 10–500. In the illustrated embodiment, the body of each stage 12–16 is defined by a number of generally wedge-shaped segments 54. The segments 54 form liquid rocket fuel and oxidizer tanks as generally indicated by the markings "F" and "O" (FIG. 3c). Any combination of chemical propellants can be used. It will be appreciated that the ratio of fuel tanks to oxidizer tanks and the tank arrangement can be varied to accommodate propulsion system requirements. The illustrated segments 54 are arranged to form alternating fuel and oxidizer tanks in side-by-side relationship. The segments 54 are attached to one another and to the structural spine 26 by any suitable technique.

Each stage 12-16 also includes a forward structural interface 56 and an aft structural interface 58, each of which may be a ring-like structural flange. The forward structural interface 56 is used for interconnection to an additional stage 14 or 16 via a separation system 20 or 22 or, in the case of the final stage, for interconnection to the payload fairing 18 by way of payload adaptor 24. The aft structural interface is used to interconnect a stage 12–16 to an underlying stage or, 12 or 14 in the case of the initial stage 12 to the launcher interface 40. Alternatively, the launcher interface 40 can be omitted and the vehicle 10 can be mounted on a sufficiently sturdy umbilical tower in preparation for launch.

Each stage 12–16 further includes a rocket engine system 60. Such a rocket engine system 60 may be a single rocket engine or may be partitioned, e.g., one engine per stage or one engine per fuel tank/oxidizer tank pair or other grouping may be provided. In the illustrated embodiment, each stage includes one thrust structure 30–34 such as a central aerospike structure. The stages 12–16 may also include doors 72 for closing the spine 26 area during launch for enhanced backpressure.

Referring to FIGS. 4a–4e, the engine system 60 for each stage, further involves individual thrusters 70 associated with each fuel/oxidizer tank pair or other segment grouping. Each thruster 70 receives fuel and oxidizer from associated segments. The fuel and oxidizer are brought into contact in a combustion chamber 64 of the thruster 70 and the resulting combustion product is accelerated and directed towards the thrust structure 30–34 by nozzle 68. In addition to providing the thrust necessary for launching, the illustrated thrusters provide a number of control functions. In this regard, each of the illustrated thrusters 70 includes a throttle control or metering valve for adjusting the total mass flow through the thruster 70. By adjusting the relative mass flows of opposing thrusters 70, the overall thrust vector of the launch system can be controlled. In addition, each of the thrusters 70 can be configured to provide a small component of tangential thrust, the direction of which can alternate from thruster-to-thruster. Roll control can thus be accomplished by creating a force imbalance with respect to the alternating thrusters, e.g., via appropriate mass flow metering. It will be appreciated that separate, dedicated thrusters may be provided for thrust vector and roll control in place of or in addition to the mechanisms described above.

FIGS. 4a–4e also show the general geometry of segment 54 and the segment/spine interface. Each segment 54 in the illustrated embodiment, has a generally wedge-shaped configuration. The segments 54 are attached to the spine 26 by bolts 74, welding or other suitable attachments. The segments 54 are also connected to one another at their ends. It will be appreciated that the segments can be connected directly to each other along the longitudinal axis forming central, hollow cavity without the need for a separate, central spine structure. It will further be appreciated that the segments 54 can be insulated for cryogenic fluid storage where applicable using external 76 and/or internal (not shown) insulation, with or without liners. The segments 54 can be constructed from metallic or advanced composite materials, with welded steel providing a low cost option. The system 10 will generally not require pressure for structural integrity due to the central spine 26 and skin thicknesses. As shown, each segment 54 can further include manifolds 66 for tank venting and pressurization. It will be appreciated that the manifolds 66 are configured to link with corresponding umbilical tower conduits for launch site venting and pressurization.

An alternative launch system 80 according to the present invention is shown in FIGS. 5–8e. The launch system 80 generally includes a first stage 82, a second stage 84, a third stage 86, a payload fairing 88 containing payload 90, an aerospike engine system 92 associated with each of the stages 82–86, separation systems 94 disposed between the stages 82–86, and a payload adapter 95 disposed between the third stage 86 and a payload fairing 88. The launch system 80 further includes a central spine 98 and can be used in connection with the launch platform 38 as described above in connection with FIG. 2.

As best shown in FIGS. 6–8e, the launch system 80 includes in-line tanks 100 within each stage 82–86. The tanks 100 include lower tanks 102 and upper tanks 104. The upper tanks 104 are connected to the ground umbilical interface 106 of each stage by way of appropriate lines 108 that allow for upper tank 104 venting and pressurization. Additional feedlines 96 connect the upper tanks 104 to thruster units 112 and similar ground umbilical manifolds.

Figure 8D:
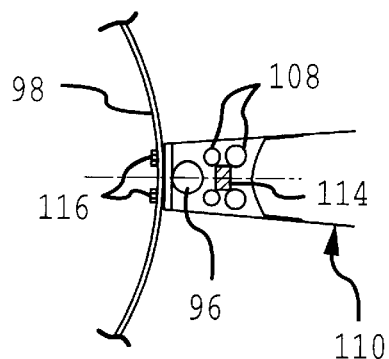
FIG. 8d is a top, cross-sectional view of a portion of the segment of FIG. 7a taken along section lines A—A.
Figure 8B:
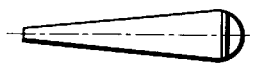
FIGS. 8a–8c are side, top and bottom views, respectively, of a segment of the stage of FIG. 6.
Figure 8A:
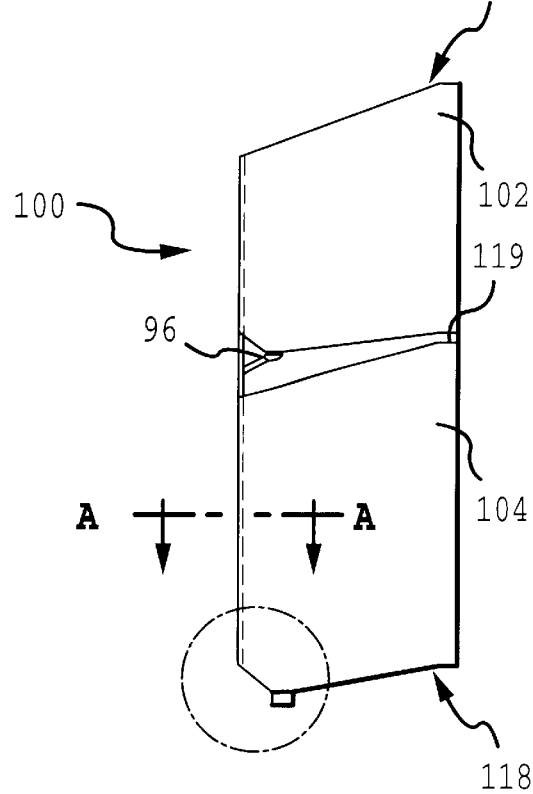
Figure 8C:
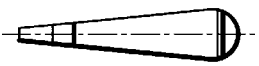
Figure 8E:
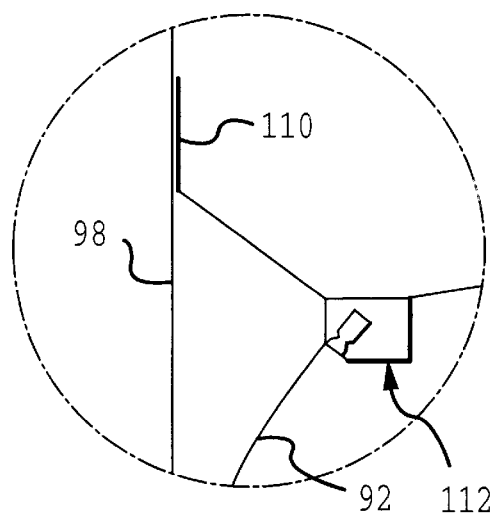
FIG. 8e is a side view of the circled portion of FIG. 8a showing details of the spine attachment and thruster interface.

The illustrated in-line tank configuration allows fuel and oxidizer to be contained within a single segment 110. In this regard, either the lower 102 or upper 104 tank within a given segment 110 can contain fuel whereas the other 102 or 104 tank contains oxidizer. Each segment 110 can further be associated with its own thruster units 112. In this manner, each individual segment 110 and associated thruster unit 112 can be constructed as a self-contained system integrating propulsion, pneumatics and structural elements. Each segment further includes a forward structural interface 117 and an aft structural interface 118 for connecting to other stages and/or the payload fairing 88 or launch pad system 38, and a fuel-to-oxidizer tank interface 119. Additionally, as shown in FIG. 8d, each stage 82–86 also includes avionics 114 for launch system control and guidance. The individual segments 110 are connected to the spine 98 by appropriate connections such as bolts 116.

The corresponding construction method involves mass producing segment units at a production facility by: fabricating the tanks 102 and 104 as integral, welded steel portions of the segment 10 and integrating them with interconnecting hardware, fabricating or otherwise providing a thruster unit 112; installing feed 96 and vent and pressurization lines 108 for interconnecting the tanks 102 and 104 to an umbilical interface and the thruster unit 112; and installing avionics and other control elements. These mass produced segment units can then be assembled on-site or shipped to another staging location. In either case, the segment units are assembled to form stages 82–86 by attaching an appropriate number of segments 110 to a structural spine 98. The segments 110 may also be interconnected at their ends. The stages 82–86 can then be completed by attaching thrust structure, such as an aerospike structure, if such structure was not provided (in segmented form) with the individual segments. As shown, each stage may further include doors 114 that can be closed at launch time to support base pressure. Finally, the stages 82–86 can be assembled, with intervening separation system 94 and the payload fairing 88 can be mounted via the payload adaptor 96, to complete the launch system 80. The launch system 80 can then be transported to the launch site and positioned on the launch pad. The umbilical tower is then extended into the spinal cavity of the system 80, the umbilical connections are made and tank fill and pressurization may begin. Alternatives for tank pressurization include a "blow down" system using high pressure bottles, or a pump and heat exchanger system using system propellants.

Figure 9:
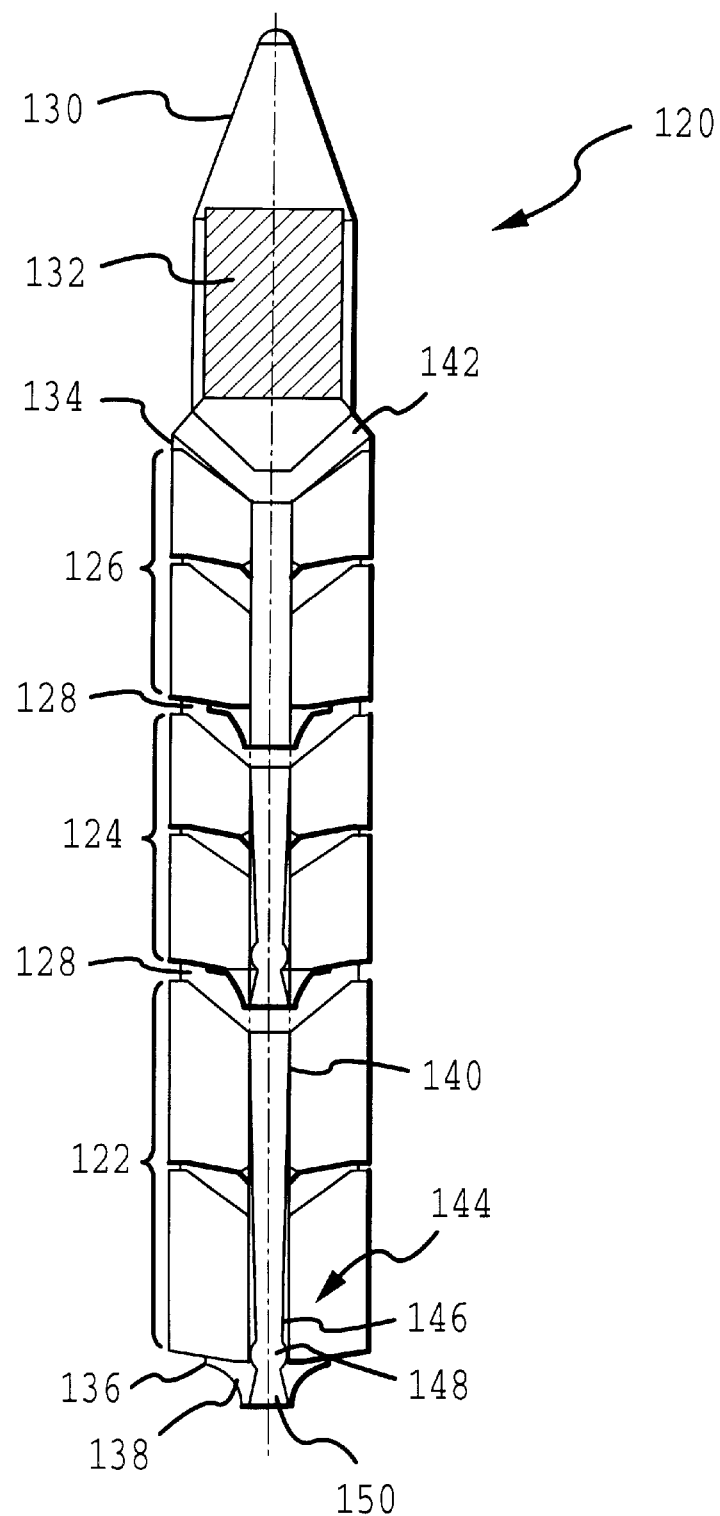
FIG. 9 is a side view of a further launch system including a supplemental jet propulsion system according to the present invention.

Referring to FIG. 9, a further alternative launch system 120 according to the present invention is shown. The launch system 120 includes first 122, second 124, and third 126 stages separated by appropriate separation systems 128. The system 120 further includes a payload fairing 130 containing payload 132. The payload fairing 130 is connected to the third stage 126 by payload adapter 134. Each stage 122–126 further includes thruster units 136 and an external aerospike nozzle 138.

The illustrated launch system 120 makes use of the central spine 140 to provide a supplemental thrust system based on jet propulsion such as ram jet or scram jet propulsion. In this regard, air inlets 142 are provided in conjunction with the payload adapter 134 or other location to allow ambient air to enter the hollow spine 140. A jet engine system 144 is provided at the base of the spine 140. The jet engine system 144 generally includes a ram or scram inlet ramp 146 for introducing air into the ram or scram combuster 148. The air is heated in the combuster 148 and is then accelerated and expelled via ram/scram nozzle 150 to provide supplemental, air breathing propulsion during launch. It will be appreciated that such jet engines 144 may be provided in connection with one or more of the stages 122–126. The heat for the combuster 148 may be generated by burning fuel from the segments or separate, dedicated tanks may be provided. While various implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A launch system that has an elongate form with a central, longitudinal axis, comprising:

at least a first propulsion element disposed within a first angular region on a first side of said longitudinal axis, including at least a first fuel tank for containing fuel in a fluid phase and a first combustion chamber in selective fluid communication with said first fuel tank;

at least a second propulsion element disposed within a second angular region on a second side of said longitudinal axis opposite said first side, comprising at least a second fuel tank for containing fuel in a fluid phase and a second combustion chamber in selective fluid communication with said second fuel tank;

thrust means for using a first combustion product from said first propulsion element and a second combustion product from said second propulsion element so as to produce a thrust said thrust means including structure defining a discharge port for concurrently receiving said first combustion product and said second combustion product and for discharging said first combustion product and said second combustion product via said discharge port to produce thrust; and interconnection means for interconnecting said first propulsion element and said second propulsion element.

2. A launch system as set forth in claim 1, wherein each of said first and second propulsion elements comprises a generally wedge-shaped structure.

3. A launch system as set forth in claim 2, further comprising a further plurality of propulsion elements each comprising a generally wedge-shaped structure, wherein said first and second propulsion elements together with said further plurality of propulsion elements are arranged in a generally annular configuration around said central longitudinal axis.

4. A launch system as set forth in claim 1, wherein said first and second propulsion elements further comprise respective first and second oxidizer tanks in selective fluid communication with said respective first and second combustion chambers.

5. A launch system as set forth in claim 4, wherein said first and second oxidizer tanks are arranged in side-by-side relationship relative to said respective first and second fuel tanks about said longitudinal axis.

6. A launch system as set forth in claim 4, wherein said first and second oxidizer tanks and said respective first and second fuel tanks are arranged in a longitudinally stacked relationship relative to said longitudinal axis.

7. A launch system as set forth in claim 1, wherein each of the first and second propulsion elements comprises at least a first oxidizer tank wherein the quantity of said at least first oxidizer tank and the quantity of said at least first fuel tank are selected to provide desired fuel/oxidizer proportioning.

8. A launch system as set forth in claim 1, wherein said first and second propulsion elements further comprise first and second metering means, respectively, for metering a mass flow thereby controlling thrust.

9. A launch system as set forth in claim 8, further comprising control means for controlling said first and second metering means to provide thrust vectoring.

10. A launch system as set forth in claim 1, wherein each of said first and second propulsion elements comprises means for providing a tangential thrust component for roll control.

11. A launch system as set forth in claim 1, wherein said first and second propulsion elements are part of a first stage of said launch system, and said launch system further comprises a second stage including at least one rocket engine for firing in temporal series with said first stage.

12. A launch system as set forth in claim 1, wherein said interconnection means comprises a spine structure defining a central longitudinal cavity.

13. A launch system as set forth in claim 12, wherein said first and second propulsion elements are attached to said interconnection means about an external circumference of said spine structure.

14. A launch system as set forth in claim 12, wherein each of said first and second propulsion elements comprises umbilical interface means adjacent to said central longitudinal cavity for interfacing with an umbilical tower of a launch facility.

15. A launch system as set forth in claim 14, wherein said umbilical means comprises one of an electrical, pneumatic or fluid interface.

16. A launch system as set forth in claim 12, further comprising jet means, associated with said central longitudinal cavity, for providing supplemental thrust by longitudinally accelerating air through said cavity.

17. A launch system that has an elongate form, comprising:

structural means defining a central, longitudinal cavity relative to said elongate form;

a first propellant tank means disposed adjacent to and secured to a first external surface portion of said structural means said first propellant tank means having a first substantially flat external wall portion;

a second propellant tank means disposed adjacent to and secured to a second external surface portion of said structural means said second propellant tank means having a second substantially flat external wall portion, said second substantially flat wall portion of said second tank bearing against said first substantially flat portion of said first propellant tank for improved strength; and a rocket engine system for combusting fuel from said first and second propellant tank means;

wherein fuel from said first and second propellant tank means is combusted in said rocket engine system to provide at least a portion of a launching thrust for launching said launch system.

18. A launch system as set forth in claim 17, wherein each of said first and second propellant tank means comprises at least a first tank for containing a liquid fuel and a second tank for containing oxidizer.

19. A launch system as set forth in claim 17, comprising a further plurality of rocket propellant tank means wherein said first and second propellant tank means together with said further plurality of propellant tank means are arranged in a generally annular configuration around said structural means.

20. A launch system as set forth in claim 17, further comprising first and second metering means, respectively, for metering a mass flow thereby controlling thrust.

21. A launch system as set forth in claim 20, further comprising control means for controlling said first and second metering means to provide thrust vectoring.

22. A launch system as set forth in claim 17, wherein each of said first and second propellant tank means comprises means for providing a tangential thrust component for roll control.

23. A launch system as set forth in claim 17, wherein each of said first and second propellant tank means comprises umbilical interface means adjacent to said central, longitudinal cavity for interfacing with an umbilical tower of a launch facility.

24. A launch system as set forth in claim 23, wherein said umbilical means comprises one of an electrical or fluid interface.

25. A launch system as set forth in claim 17, further comprising jet means, associated with said central, longitudinal cavity for providing supplemental thrust by longitudinally accelerating air through said cavity.

26. A method for use in constructing a launch system, comprising the steps of:

providing first and second fuel tanks, first and second oxidizer tanks, and first and second thrusters each having a combustion chamber section and a nozzle section;

first assembling said first fuel tank, said first oxidizer tank and said first thruster to form a first propulsion unit, wherein fuel from said first fuel tank contacts oxidizer from said first oxidizer tank in said combustion chamber section, thereby forming a first combustion product that is expelled via said nozzle section to provide a first thrust;

second assembling said second fuel tank, said second oxidizer tank and said second thruster to form a second propulsion unit, wherein fuel from said second fuel tank contacts oxidizer from said second oxidizer tank in said combustion chamber section thereby forming a second combustion product that is expelled via said nozzle section to provide a second thrust; and securing said first propulsion unit to a first external surface portion of an elongate hollow central spine and securing to a second external surface portion of said elongate hollow central spine said second propulsion unit such that said interconnected units are disposed external to a cylinder defined by said central spine, wherein said first thrust produced by said first unit is combined with said second thrust produced by said second unit in launching said launch system.

27. A method as set forth in claim 26, wherein said step of first assembling comprises interconnecting each of said first fuel tank and said first oxidizer tank to said combustion chamber section so as to selectively allow for flow of fuel and oxidizer to said combustion chamber section.

28. A method as set forth in claim 26, wherein said central spine area is defined by a separate structural spine and said step of mounting comprises attaching each of said first and second fuel tanks and said first and second oxidizer tanks to said structural spine.

29. A method as set forth in claim 26, further comprising the steps of mass producing a multiplicity of identical fuel tanks, mass producing a multiplicity of identical oxidizer tanks, obtaining said first and second fuel tanks from said mass produced multiplicity of fuel tanks, and obtaining said first and second oxidizer tanks from said mass produced multiplicity of oxidizer tanks.

\* \* \* \* \*

UNITED STATES PATENT AND TRADEMARK OFFICE
CERTIFICATE OF CORRECTION

| | |
|---|---|
| PATENT NO. | : 6,036,144 |
| DATED | : March 14, 2000 |
| INVENTOR(S) | : Sisk |

It is certified that error appears in the above-identified patent and that said Letters Patent is hereby corrected as shown below:

Title page,
Line [75], after David, delete "S." and insert therefor -- B. --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*